(12) United States Patent
Gotta

(10) Patent No.: US 6,886,647 B1
(45) Date of Patent: May 3, 2005

(54) DUAL MOTOR AXLE-DRIVEN GENERATOR SYSTEM FOR ELECTRIC VEHICLES

(76) Inventor: Bruce Gotta, P.O. Box 146, 4 Blackfoot Rd., Hewitt, NJ (US) 07421

( * ) Notice: Subject to any disclaimer, the term of this patent is extended or adjusted under 35 U.S.C. 154(b) by 0 days.

(21) Appl. No.: 10/462,564

(22) Filed: Jun. 17, 2003

(51) Int. Cl.[7] ............................................... B60K 1/00
(52) U.S. Cl. .................... 180/65.1; 180/65.3; 180/65.4
(58) Field of Search .............................. 180/65.2, 65.6, 180/65.4, 65.8, 65.1, 65.7; 318/34, 41, 47, 318/308; 290/17; 475/151, 3, 5

(56) References Cited

U.S. PATENT DOCUMENTS

| | | | | |
|---|---|---|---|---|
| 2,571,284 A | * | 10/1951 | Nims ........................... | 290/17 |
| 4,270,622 A | * | 6/1981 | Travis ......................... | 180/65.4 |
| 5,195,600 A | * | 3/1993 | Dorgan ........................ | 180/65.2 |
| 5,289,890 A | * | 3/1994 | Toyoda et al. ............... | 180/65.8 |
| 5,365,153 A | * | 11/1994 | Fujita et al. ................... | 318/34 |
| 5,512,022 A | * | 4/1996 | Suzuki ........................... | 475/5 |
| 5,537,011 A | * | 7/1996 | Bachman et al. .............. | 318/34 |
| 5,934,397 A | * | 8/1999 | Schaper ....................... | 180/65.2 |
| 5,971,088 A | * | 10/1999 | Smith ........................... | 180/165 |
| 6,105,696 A | * | 8/2000 | Chen ............................ | 180/65.1 |
| 6,364,806 B1 | * | 4/2002 | Spaniel ........................ | 180/65.7 |
| 6,708,788 B2 | * | 3/2004 | Kuwayama ................. | 180/65.2 |

* cited by examiner

Primary Examiner—Christopher P. Ellis
Assistant Examiner—Hua Phan
(74) Attorney, Agent, or Firm—Michael I Kroll

(57) ABSTRACT

A dual motor axle driven system for powering a vehicle. A first battery pack provides power to a first electric motor and a second battery pack provides power to a second electric motor. A generator is connected to a differential gear train and the first and second battery packs. Rotation of the wheels transfers rotational kinetic energy to the differential gear train for conversion into electrical energy by the generator for recharging the first and second battery packs while the vehicle is in motion. A tachometer measures a revolution speed of a drive shaft. The vehicle is powered by the first electric motor when the measured revolution speed of the drive shaft is less than a threshold value and by both electric motors when greater than a threshold value. The generator recharges the second battery pack when the vehicle is powered by the first electric motor and vice versa.

7 Claims, 8 Drawing Sheets

DUAL MOTOR AXLE-DRIVEN GENERATOR SYSTEM FOR ELECTRIC VEHICLES

BACKGROUND OF THE INVENTION

1. Field of the Invention

The present invention relates generally to electric generators for vehicles and, more specifically, to an axle-driven electric generator for recharging electric batteries used for powering an electric vehicle while the vehicle is in use in order to extend the cruising range between required charges from an external electrical source.

2. Description of the Prior Art

Numerous types of generators designed for powering electric vehicles have been provided in the prior art. For example, U.S. Pat. Nos. 4,042,056; 4,119,862; 4,498,551; 4,935,689; 5,083,077; 5,215,156; 5,224,563; 5,230,402; 5,541,494; 5,842,534; 5,858,568 and European Patent No. EP 1 085 644 A2 are all illustrative of such prior art. While these generators designed for powering electric vehicles may be suitable for the purposes for which they were designed, they would not be as suitable for the purposes of the present invention, as hereinafter described.

U.S. Pat. No. 4,042,056

Inventor: Elwood R. Horwinski

Issued: Aug. 16, 1977

A gasoline and battery-powered electric vehicle wherein the start and the running of the car are effected by an electric motor except in circumstances where the battery charge is depleted, in which case the normal cruising and higher speeds are then obtained using a gasoline or internal combustion engine which can be cut in either automatically or at will. The electric motor is powered by storage batteries that can be recharged from a generator driven by the internal combustion engine, or else from house current. One pair of wheels of the vehicle is powered by the internal combustion engine through a magnetic clutch and differential. The other set of wheels is powered through an infinitely variable mechanical transmission comprising cone pulleys or cone chains whose ratio is power-controlled in accordance with the driver's desires or else with the speed of the vehicle. The infinitely variable transmission has a very high speed-ratio for starting the vehicle, after which the speed ratio reduces either automatically or under the driver's direction as the vehicle gains speed. In cases where the battery charge is, say, below one half of the fully-charged condition, the car upon attainment of a predetermined cruising speed will discontinue driving of the electric powered means, and this can be replaced by the internal combustion engine. Thus, with the arrangement disclosed, city driving can be characterized by the use of electrical power whereby air pollution is nil. Only minimal polluting exhaust occurs for higher speed driving, as along highways and the like, in those cases wherein the battery charge is below one half.

U.S. Pat. No. 4,119,862

Inventor: Choichi Gocho

Issued: Oct. 10, 1978

An electric motor car wherein an electric motor for driving the car is energized by a fuel engine driven generator and a battery is connected in parallel with the motor to be float charged by the generator. Control apparatus is provided for always maintaining the output of the generator at a constant value irrespective of variations in the load and for supplying the varying component of the load from the battery.

U.S. Pat. No. 4,498,551

Inventor: Dominic S. Arbisi

Issued: Feb. 12, 1985

A battery-driven car which has an electrical system including a minimum number of electric storage batteries as the power source, a high-voltage converter with a high-voltage capacitor bank for driving a direct current impulse motor combined with a generator for supplying current to motor/generator sets respectively integrated with the wheels of the vehicle to drive the same or for recharging the batteries in accordance with a microprocessor control system, the wheel-actuated generators providing recharging current for the batteries whenever the motor component is not being energized and in addition, said electrical system also including an air-driven turbine generator component for recharging the batteries when the vehicle reaches a predetermined speed in accordance with the microprocessor controls.

U.S. Pat. No. 4,935,689

Inventor: Tetsuzo Fujikawa

Issued: Jun. 19, 1990

A vehicle mounted engine generator system is disclosed for supplying electricity to external electrical appliances and equipment used inside a camping car or outdoors in the camping site, which comprises a secondary water-cooled internal combustion engine of relatively small size and an engine generator electrically connected to the engine. The secondary engine has its cooling jacket connected to a cooling line supplying it with cooling water for engine cooling. Also, the cooling line is connected to a radiator connected to the main internal combustion engine of water-cooled type so that the heated cooling water through the secondary engine is cooled by the same radiator as for the main engine. Also, the secondary engine is electrically connected to the battery for the main engine in such a manner that the battery can be recharged from the secondary engine as well.

U.S. Pat. No. 5,083,077

Inventor: Alan Wallace et al.

Issued: Jan. 21, 1992

An onboard power generation system for use on board a vehicle, such as a passenger car, includes a brushless doubly-fed generator. The generator has a rotor with rotor conductors and a stator with stator windings, the stator windings comprising first and second polyphase stator systems. The generator rotor is mechanically coupled to and driven by the vehicle engine with a driving force to produce an AC power output from the first polyphase stator system. The generation system has a rectifier which receives and rectifies the generator first polyphase stator system AC power output into DC power for delivery to a DC bus of the generator power system. A sensor senses a parameter of the AC power output received by the rectifier and produces a sensor signal in response thereto. A converter receives the sensor signal, and in response thereto, converts power received from an excitation power source into excitation power for the generator second polyphase stator system. The converter operates to produce a controlled flow of AC power output from the first polyphase stator system of the generator regardless of variations of the driving force of the vehicle engine. A method is also provided of generating DC power on board a vehicle using the above-described generation system.

U.S. Pat. No. 5,215,156

Inventor: Nathan Stulbach et al.

Issued: Jun. 1, 1993

A vehicle having an electro-generating system that includes a dynamoelectric generator. The shaft of the dynamoelectric generator is linked directly or indirectly with the rotating axle of the road wheels of the vehicle, preferably via a mechanical turns amplifier. The turns amplifier will multiply the rotation rate of the electro-generating system and increase the production capacity of electric power. The dynamoelectric generator can be utilized to recharge a storage battery driving the vehicle while the car is in motion, especially automatically when the vehicle is going down hill. The vehicle's electric motor can be driven directly from a dynamoelectric generator in place of a storage battery after the vehicle is moving. In railroad cars (freight and passenger) the electro-generating system can be utilized to charge storage batteries, with their electricity utilized for other electro-energy requirements.

U.S. Pat. No. 5,224,563

Inventor: Souichi Iizuka

Issued: Jul. 6, 1993

There is disclosed an energy regenerating mechanism of an vehicle, particularly to that adapted for an electric car. The energy regenerating mechanism is characterized in that a plurality of generators are provided so that the kinetic energy generated when the engine idles and the vehicle continues running is converted into electric energy.

U.S. Pat. No. 5,230,402

Inventor: Clark et al.

Issued: Jul. 27, 1993

An electric car is powered from a primary power source in the form of a three-phase parallel resonant electric motor operated at a constant speed (the speed of resonance). The electric motor is provided with operating power from an inverter coupled to storage batteries in the electric car. The motor drives a main hydraulic pump, which is hydraulically connected with a pair of variable displacement drive motors, each connected to different drive wheels on opposite sides of the vehicle. The fluid flow through the pump is varied from 0% to 100% to control the speed of operation of the drive motors connected to the drive wheels of the vehicle.

U.S. Pat. No. 5,541,494

Inventor: Teruo Sannomiya

Issued: Jul. 30, 1996

A motor control system for an electric car includes a detector for determining when an input voltage or an output voltage of a DC power circuit falls below a respective predetermined value to operate a switching signal stopper circuit which interrupts or prevents the application of pulse width modulated (PWM) signals to current control elements switching DC currents to generate three-phase AC currents in coils of the motor. The detection of an abnormal drop in the input voltage or the output voltage indicates a malfunction causing excessive currents which could burn out the control elements and/or the power circuit in the absence of prompt interruption of the PWM switching signals.

U.S. Pat. No. 5,842,534

Inventor: Andrew A. Frank

Issued: Dec. 1, 1998

A charge depletion method and apparatus for operating the electric motor and small auxiliary power unit, such as an internal combustion engine, in a hybrid electric vehicle (HEV) separately or together depending upon the driving conditions. Operation of the electric motor and auxiliary power unit are coordinated so that the vehicle operates as zero emissions vehicle (ZEV) or electric car at all speeds below a highway cruising threshold, unless the depth of discharge of the batteries exceeds a charge threshold in which case the vehicle operates in an HEV mode. Further, the vehicle operates in an HEV mode at speeds above the cruising threshold. The batteries are depleted during operation and are not charged by the auxiliary power unit, except during emergencies in which case the batteries are only charged enough to provide a performance enhancement to the small auxiliary power unit.

U.S. Pat. No. 5,858,568

Inventor: Michael S. Hsu et al.

Issued: Jan. 12, 1999

A power supply system for enhancing the economic viability of different modes of transportation that incorporate fuel cells to generate electricity. For example, the power supply system of the present invention provides for the off-board use of the electric power generated by an on-board power plant, such as a fuel cell, of a mobile vehicle power system, such as an electric car. Off-board use, or use remote from the vehicle, of the electrical power includes the delivery of power to a remote site. Off-board stations are provided for delivery of fuel to the vehicle and/or for receiving the electrical power generated by the fuel cell. The off-board station and the vehicle are appropriately equipped for quick and easy interconnection such that electrical power is drawn from the fuel cell for off-board use.

European Patent Number EP 1 085 644 A2

Inventor: Kim Houng Joong et al.

Issued: Mar. 21, 2001

The invention relates to a hybrid drive type vehicle having a permanent magnet type synchronous motor which can provide high torque characteristics in low revolution speed range of the engine and high power generation characteristics at high revolution speed range of the engine. The hybrid drive type vehicle includes an electric rotary machine being formed with a stator and a rotor. A field magnet of the rotor includes a first field magnet and a second field magnet. The first and second field magnets oppose with a magnetic pole of the stator and have a mechanism for varying a phase of a magnetic pole resulting from a combination of the first and second field magnets relative to the magnetic pole of the first field magnet depending upon direction of a torque of the rotor.

SUMMARY OF THE PRESENT INVENTION

The present invention relates generally to electric generators for vehicles and, more specifically, to an axle-driven electric generator for recharging electric batteries used for powering an electric vehicle while vehicle is in use in order to extend the cruising range between required charges from an external electrical source.

A primary object of the present invention is to provide a dual engine axle-driven generator system for electric vehicles that will effectively increase the distance such a vehicle could travel between charges from an external source.

Another object of the present invention is to provide a dual motor axle-driven generator system for electric vehicles that will have at least two battery banks for supplying power to the vehicle wherein one battery bank will power the vehicle while the other battery bank is recharging.

Yet another object of the present invention is to provide a dual motor axle-driven generator system for electric vehicles having a secondary motor powered by the charging battery bank to provide supplemental power to the vehicle during hard acceleration.

Still yet another object of the present invention is to provide a dual motor axle-driven generator system for electric vehicles that is environmentally friendly due to its regenerative capabilities for converting kinetic energy produced by the connected axle to charge a battery bank thus minimizing the amount of external electricity required for operation and not requiring the use of an internal combustion engine to power the vehicle.

Another object of the present invention is to provide a dual motor axle-driven generator system for electric vehicles that is economical in cost to manufacture and operate.

Yet another object of the present invention is to provide a dual motor axle-driven generator system for electric vehicles that is simple and easy to use.

Additional objects of the present invention will appear as the description proceeds.

In the system of the present invention, a generator operates on the rotation of at least one connected axle. When forward motion of the vehicle is initiated, a decoupler engages the generator for charging one of two rechargeable battery banks. The battery banks are initially charged by an external power source prior to vehicular operation at which point a primary electric motor is powered by a first battery bank and a secondary battery bank powers a secondary electric motor. The secondary electric motor is only activated during hard acceleration. When the first battery bank is almost depleted, it receives a charge from the generator operating on a charge generated in response to the rotation of the axle as the vehicle travels forward. While the primary battery pack is charging, the primary electric motor is powered by the secondary electric motor. The cruising range of the vehicle is thus increased since one battery bank powers the primary motor while the movement of the vehicle operates the generator which is constantly recharging the other battery bank except when it is necessary to power the secondary motor during hard acceleration. The secondary motor is activated once the tachometer reaches a predetermined RPM reading.

The present invention overcomes the shortcomings of the prior art by providing a dual motor axle-driven generator system for electric vehicles that relies exclusively on electrical power and has regenerative capabilities that permit the vehicle to extend the cruising range beyond that of conventional electric vehicle. Furthermore, a dual motor configuration overcomes the acceleration problems inherent in other electric vehicles.

To the accomplishment of the above and related objects, this invention may be embodied in the form illustrated in the accompanying drawings, attention being called to the fact, however, that the drawings are illustrative only, and that changes may be made in the specific construction illustrated and described within the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

Figure 7:
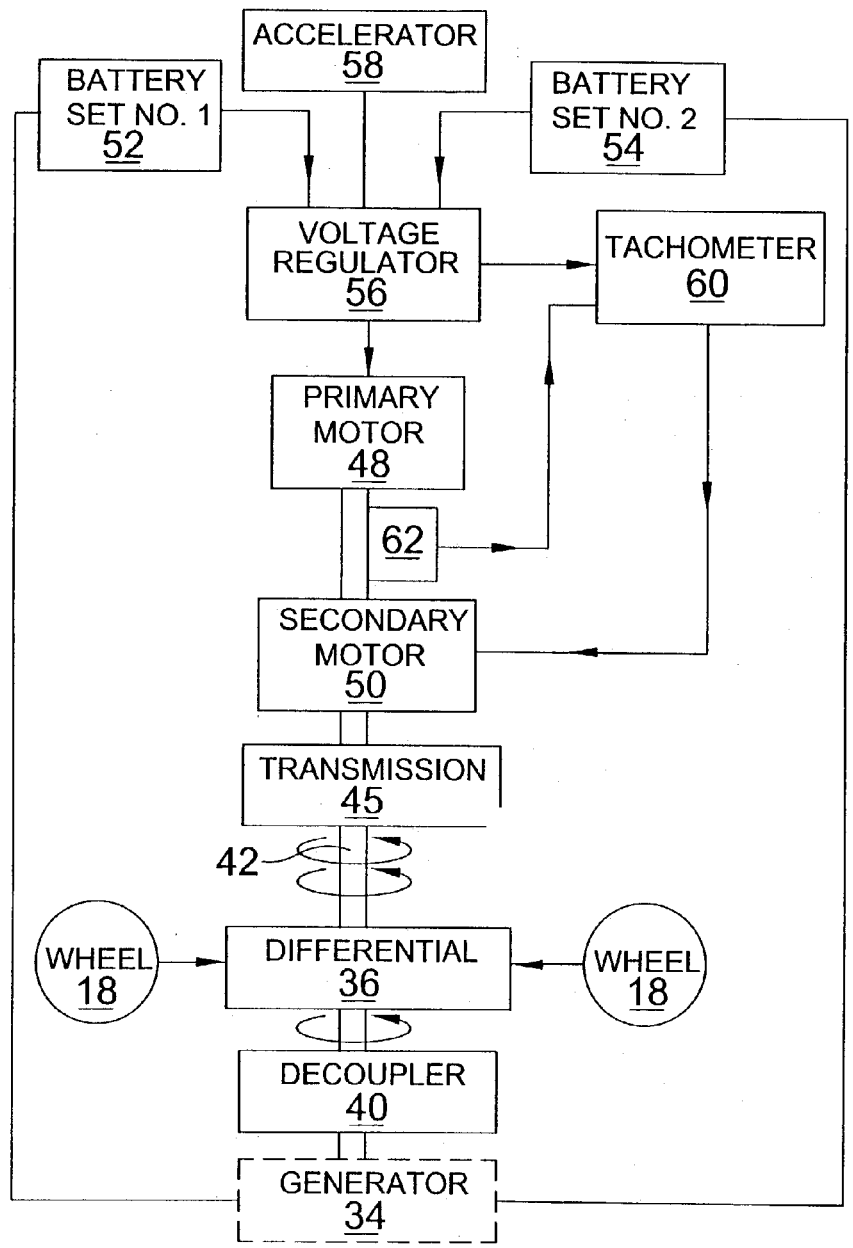
Figure 8:
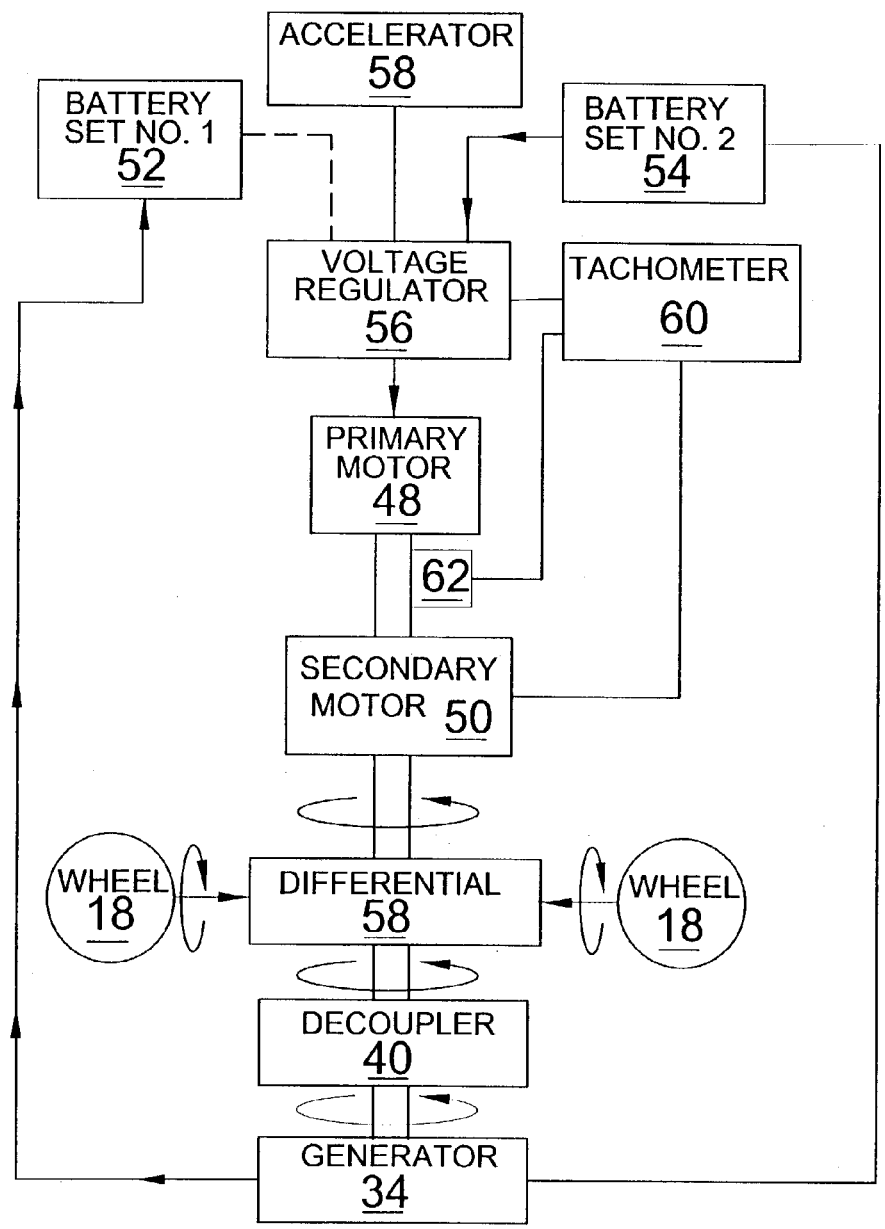

FIG. 7 is a flow diagram illustrating a vehicle operating on the primary and a secondary motor connected to the dual motor axle-driven generator system of the present invention when the secondary motor is activated under hard acceleration; and FIG. 8 is flow diagrams illustrating a vehicle operating on one battery bank while the dual motor axle-driven generator system of the present invention charges a second battery bank.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

DESCRIPTION OF THE REFERENCED NUMERALS

Turning now descriptively to the drawings, in which similar reference characters denote similar elements throughout the several views, the Figures illustrate the dual motor axle-driven generator system of the present invention. With regard to the reference numerals used, the following numbering is used throughout the various drawing figures.

10 dual motor axle-driven generator system
12 electric vehicle
14 steep embankment
16 road sign indicating a long range before refueling station
18 wheels
20 struts
22 upper control arm
24 lower control arm
26 axle
28 universal joint
30 differential housing
32 mounting brackets
34 generator
36 differential gear
38 generator gear
39 generator gear shaft
40 decoupler
42 drive shaft
44 drive shaft gear
45 transmission
46 bearing
47 first pair of recesses
48 primary motor
49 fourth recess
50 secondary motor
51 third recess
52 first battery
54 second battery
56 voltage regulator
58 accelerator
60 tachometer
62 tachometer sensor
64 secondary driving wheel
66 secondary differential
68 secondary drive shaft
70 first clutch component
72 second clutch component

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Turning now descriptively to the drawings, in which similar reference characters denote similar elements throughout the several views, FIGS. 1 through 8 illustrate the dual motor axle-driven generator system of the present invention generally by the numeral 10.

Figure 1:
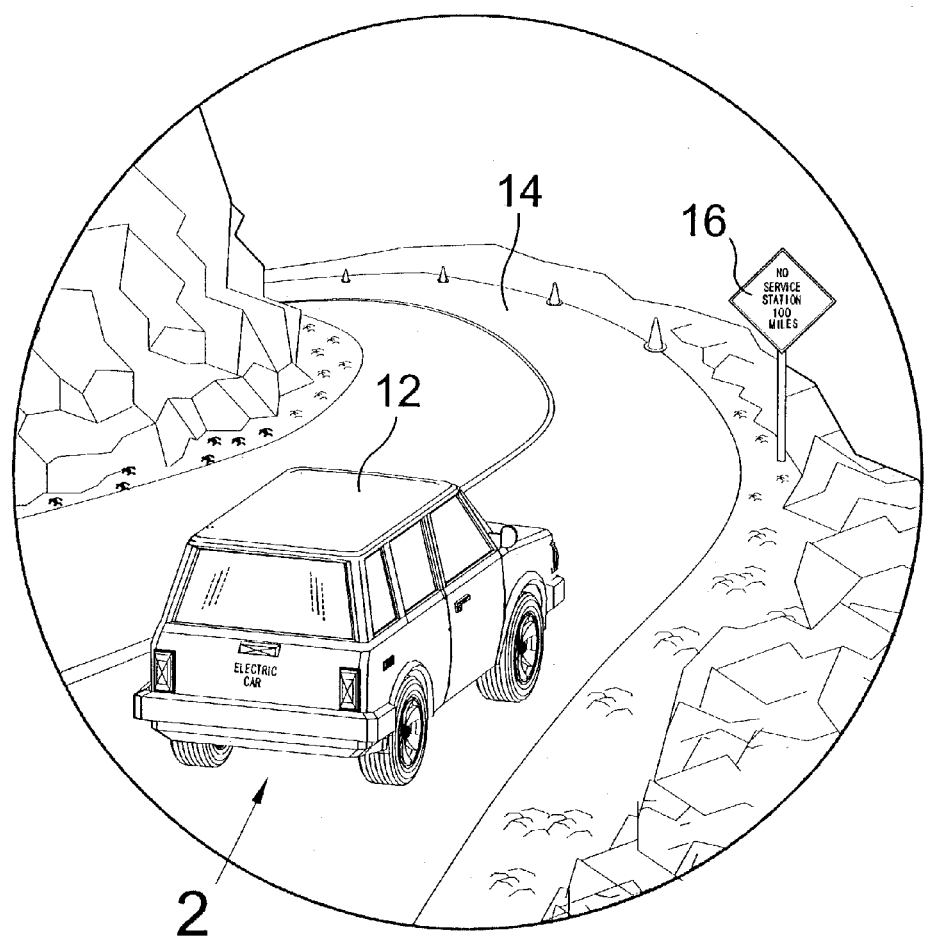
FIG. 1 is an illustrative view of an electric vehicle equipped with the dual motor axle-driven generator system of the present invention climbing a steep embankment.

FIG. 1 is an illustrative view of an electric vehicle 12 operating while equipped with the dual motor axle-driven generator system 10 of the present invention. The dual motor configuration provides a primary electric motor to drive the wheels of the vehicle 12 under normal use conditions and a secondary motor to selectively drive the wheels of the vehicle. When both motors are activated in unison, the extra power enables the electric vehicle 12 to perform maneuvers requiring additional acceleration such as passing another vehicle or surmounting a steep embankment 14, as illustrated in FIG. 1. The illustrated vehicle 12 has the extra power necessary for accelerating up a steep embankment 14 because of the dual-motor configuration of the present invention. The secondary motor provides additional positive torque to the drive train, thus, propelling the vehicle up the embankment 14.

A first battery bank powers the primary motor and a second battery bank powers the secondary motor. The generator 10 of the present invention charges the battery banks when they are not powering their respective motor. One such example would be when the vehicle 12 is coasting in a forward direction in which both batteries would receive a regenerative charge. The regenerative powers of the generator system 10 of the present invention allow the vehicle 12 to achieve increased cruising range before recharging at an external rechargeable battery bank. Thus, not only does the illustrated vehicle 12 have the extra power necessary for accelerating up a steep embankment 14 because of the dual-motor configuration, but additionally, the ability to advance an extended distance between recharging times for the batteries by external power sources. This is due to the regenerative powers of the generator system 10. The additional power required for the climb does not exhaust the resources of the primary battery bank as the secondary battery bank is engaged to power the secondary motor and provide additional power when the acceleration of the vehicle reaches a predetermined value. The illustrated electric vehicle 12 can proceed to accelerate up the hill without hesitation, even though another service station is not for another 100 miles, as indicated by a road sign 16, because the extra power necessary to surmount the steep embankment 14 is be provided by a secondary motor as opposed to completely draining the primary battery bank.

Figure 2:
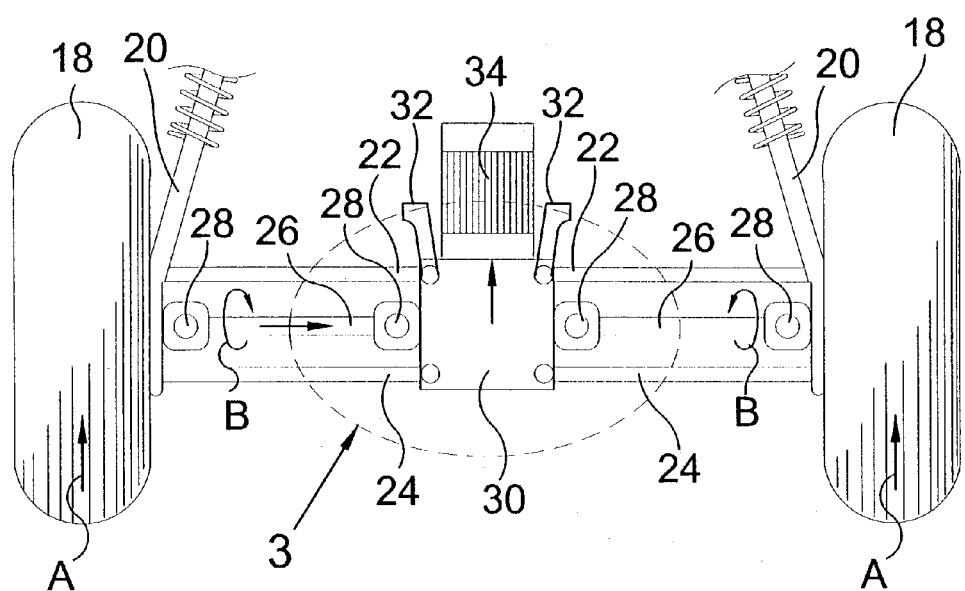
FIG. 2 is a rear view of the axle assembly of the electric vehicle equipped with the generator system of the present invention.

FIG. 2 is a rear view of an axle assembly equipped with the generator 34 of the present invention as seen in the direction of the arrow labeled with the numeral 2 in FIG. 1. A differential housing 30 is positioned between the rear wheels 18 of the vehicle 12. The housing 30 is mounted to the chassis (not illustrated) by mounting brackets 32. Both rear wheels 18 are connected to the vehicle by a strut 20. The struts 20 are spring mounted for vertical suspension purposes. An upper support arm 22 and a lower support arm 24 are pivotally mounted to each strut 20. The support arms 22 and 24 extend from the struts 20 to the differential housing 30 where the upper support arms 22 are pivotally connected to the upper near corner of the housing 30 and the lower support arms 24 are connected to the lower near corner of the housing 30. The support arms 22 and 24 prevent horizontal and rotational movement of the struts 20 while allowing restricted vertical movement of the struts 20. Each upper support arm 22 extends horizontally from each strut 20 to the nearest upper corner of a differential housing 30 and each lower support arm 24 extends horizontally from each strut 20 to the lower corner of the differential housing 30. An axle 26 extends from each rear wheel 18 to the differential housing 30. Each axle 26 has a universal joint 28 positioned on each end for connecting to a respective wheel and differential. The universal joint 28 allows for the axle 26 to pivot vertically about a horizontal pivot point at each universal joint 28 while additionally allowing the axle 26 to rotate about their longitudinal axis. The generator 34 is mounted atop the differential housing 30. The differential housing 30 contains a gear train therein (not illustrated), for meshing with the axles 26 allowing the wheels 18 to turn at different speeds when the vehicle 12 turns, thus preventing screeching its tires and excessive negative torques on a drive shaft. The use of a differential gear train is known in the art, however, in this embodiment the generator 34 has been adapted to connect with the gear train.

The rotation of rear wheels 18, as indicated by the arrows identified by the letter A, creates a torque on the connected axles 26. The axles 26 rotate in the corresponding direction to the wheel 18, as indicated by the arrows identified by the letter B. The gear configuration within the differential housing 30 is connected to the generator 34. When the vehicle moves in a forward direction, the rotational kinetic energy generated by the rotation of the wheels is transferred along the axles 26 carrying the rotation into the differential gear train and up into the generator 34 where the rotational kinetic energy is transferred to electric energy.

Figure 3:
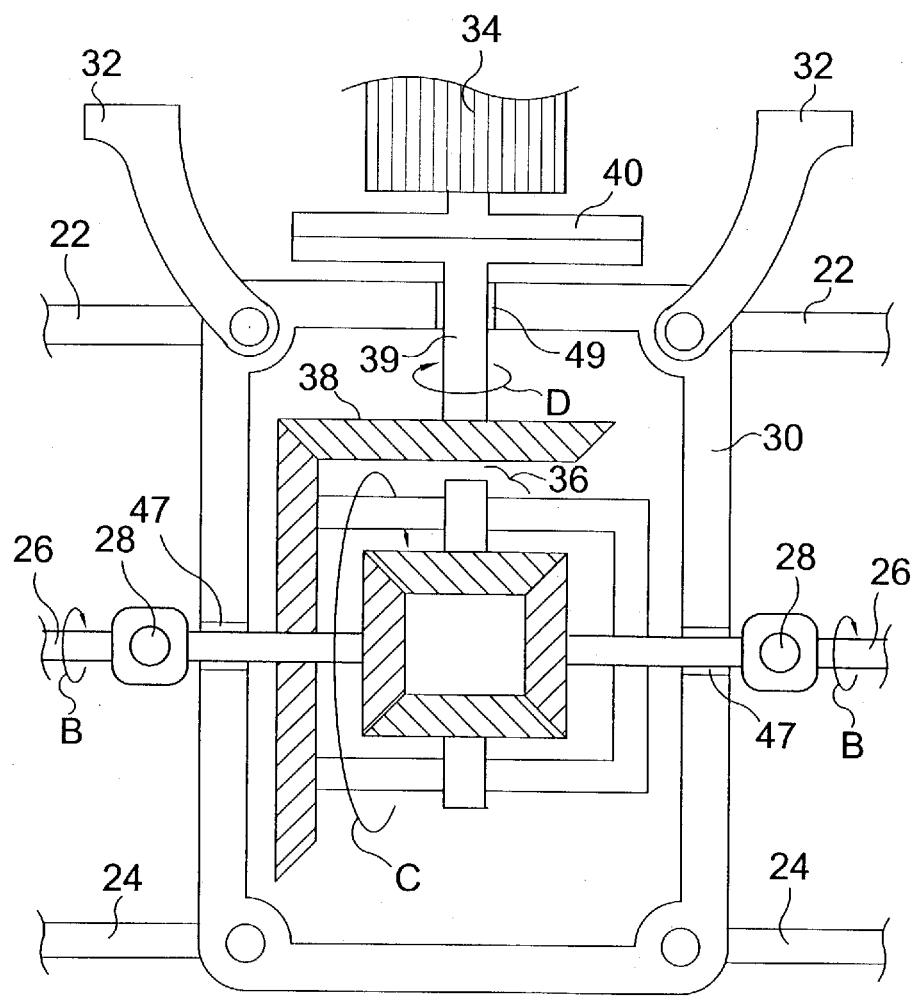
FIG. 3 is a cross sectional view of the connection between the axle assembly and the generator of the present invention when the generator is attached to the differential gear.

FIG. 3 is a cross sectional view of the connection between the axle assembly and the generator 34 of the present invention taken from with in the circle identified by the numeral 3 in FIG. 2. A differential housing 30 is rigidly mounted to the vehicle chassis by a plurality of brackets 32. Within the differential housing 30 is the differential gear 36. The differential housing 30 has four recesses lined with a bearing. First and Second recesses 47 are positioned on opposite sides of the housing for securing the differential gear 36, allowing respective universal joints 28 to remain outside the differential housing 30 and facing the respective wheels 18. An axle 26 extends from each universal joint 28 to a respective wheel, thus connecting the wheels 18 to the differential gear 36 as can be seen from FIG. 2.

Figure 4:
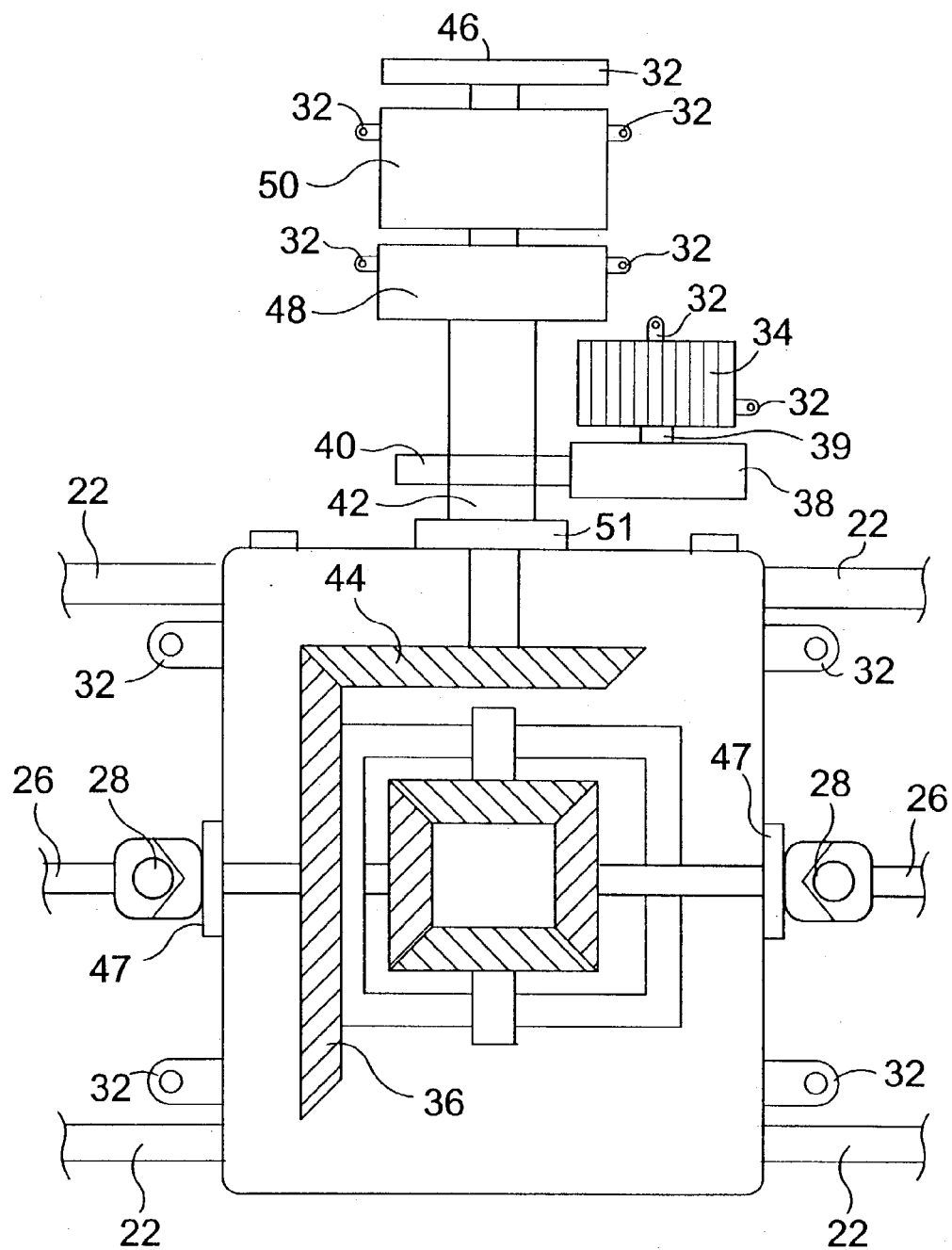
FIG. 4 is a top view of the axle assembly of an electric vehicle equipped with the generator of the present invention engaging the drive shaft.

A third recess 51 as can be seen in FIG. 4 is positioned opposite of view illustrated in FIG. 3. A drive shaft (not illustrated) extends therethrough and will be further discussed with respect to FIG. 4.

A fourth recess 49 is positioned atop the differential housing 30 for securing a generator gear 38 allowing the generating gear mesh with the differential gear 36 within the differential housing 30. The shaft 39 of the generator gear 38 extends through the recess 49 and it is attached to a decoupler 40. The decoupler 40 engages the shaft 39 when rotated in a first direction and disengages when rotated in a second direction.

A driving force may be applied to the drive shaft meshes with the differential gear 36 to drive the axles 26. The driving of the axels 26 cause thus rotating the respective wheels 18 connected thereto rotate and thereby propelling the vehicle 12. When a driving force is not applied to the drive shaft, the vehicle coast until braking is applied. When coasting, the kinetic energy of the wheels 18 rotates the differential gear 36. The differential gear 36 rotates in a direction indicated by directional arrow identified by the letter C. The differential arrow C correspond with the direction of the arrow B indicating a direction of rotation of the axles 26. A generator gear 38 also meshes with the differential gear 36. The rotation of the differential gear 36 as indicated by line C causes the rotation of the meshing generator gear 38, as indicated by directional arrow D. When rotating in direction D, the generator gear 38 engages the decoupler 40, thus, transferring the rotational kinetic energy to the generator 34 for conversion into electric energy. If rotation is reversed from that shown by directional arrow D by moving the vehicle 12 in a reversed direction, the decoupler 40 disengages the generator gear 38, thus preventing reverse rotation of the generator 34.

FIG. 4 is a top view of the axle assembly of an electric vehicle 12 equipped with the dual motor axle-driven generator system 10 of the present invention. As can be seen from this figure, the generator 34 is attached to the drive shaft 42 as opposed to the differential gear 36 as seen in FIG. 3. As described with respect to in FIG. 1, a differential housing 30 is rigidly mounted to the vehicle chassis by a plurality of brackets 32 the differential housing 30; and the upper control arms 22 are connected between the differential housing 30 and the struts 20. This connection secures the struts 20. The differential housing 30 in this Figure, however, has three, recesses as opposed to four recesses shown in FIG. 3, lined with a bearing. Two of the recesses 47 are positioned on opposite sides for securing the universal joints 28 for connecting the axles 26, as described in Figure Ito the differential housing 30. The third recess 51 secures a drive shaft 42. The drive shaft 42 is a cylindrical rod for providing a driving force to the differential gear 36. The drive shaft 42 extends through the third recess 51. Therein, it is connected to the drive shaft gear 44 for meshing with the differential gear 36. The opposite end of the shaft 42 furthest from the differential housing 30 is secured by a bearing 46. The bearing 46 is rigidly mounted to the chassis of the vehicle 12 by brackets 32. A primary motor 48 and a secondary motor 50 are mounted to the drive shaft 42 at predetermined locations between the bearing 46 and the differential housing 30 for selectively providing a driving force to the drive shaft 42. Each motor is rigidly mounted to the chassis of the vehicle by brackets 32. Each motor is electrically powered by at least one of a plurality of battery banks. When power is provided by at least one of the battery banks the activated motor applies a torque to the drive shaft 42 thus rotating the drive shaft gear 44. Rotation of the drive shaft gear 44 rotates the differential gear 36, which is connected to the axles 26 of the wheels 18. The differential gear 36 allows the axles 26 to rotate its respective wheel 18 at individual rates for accommodating turns without placing excessive negative torques on the drive shaft 42. When the vehicle moves in a forward direction the battery bank of the motor not providing a driving force is provided regenerative electric energy by the generator 34. The generator 34 is mounted to the chassis by brackets 32 at a predetermined position alongside the drive shaft 42. Extending from the generator is a shaft 39, which connects the generator 34 to a generator gear 38. The generator gear 38 meshes with a decoupler 40. The decoupler 40 is mounted to the perimeter of the drive shaft 42. Rotation of the drive shaft 42 in a direction corresponding to forward movement engages the decoupler and generator gear 38 thus, driving the generator 34. The decoupler 40 may contain a flywheel to allow the generator to continue spinning and thereby charge the battery banks even when the vehicle is stopped. When the drive shaft reverses rotational direction, the decoupler 40 disengages the generator gear 38.

When driven, the generator provides regenerative electric energy to an unused or dangerously low battery bank.

Figure 5:
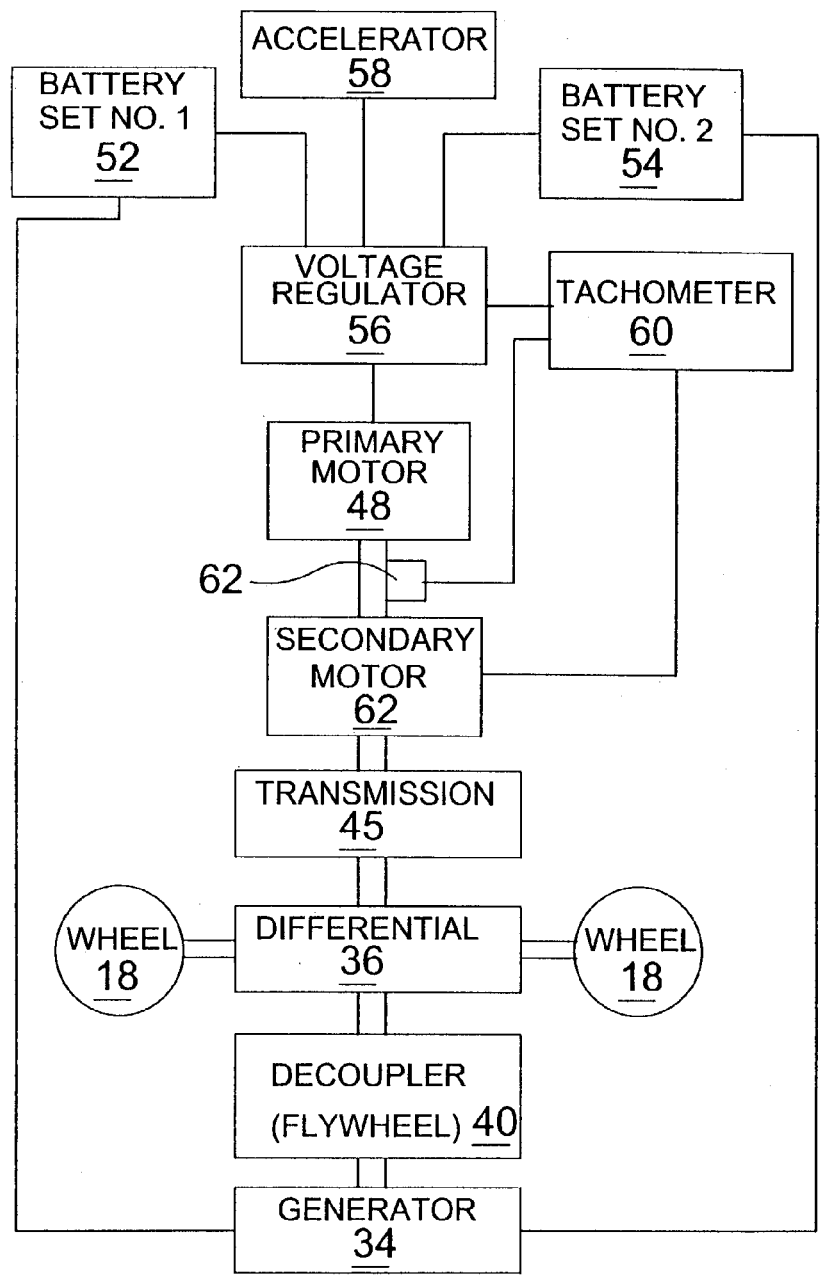
FIG. 5 is a block diagram showing the mechanical and electrical connections of the components of the dual motor axle-driven generator system of the present invention.

FIG. 5 is a block diagram of the axle generator of the present invention. Mechanical connections are illustrated as double line and electrical connections are illustrated as single lines. As can be seen from this figure the primary motor 48 and a secondary motor 50 are mechanically connected to the drive shaft 42 for providing a torque for rotating the drive shaft 42. A transmission 45 is mechanically connected between the secondary motor and the differential 36 to the drive shaft 42 for providing a mechanical advantage by increasing or decreasing the revolution speed of the drive shaft 42. The drive shaft 42 is mechanically connected to a differential 36. The differential 36 drives the designated mechanically connected wheels 18 when the motors 48 and 50 provide a driving force to the drive shaft 42. The transmission 45 is mechanically connected to the drive shaft 42 for providing a mechanical advantage by increasing or decreasing the revolution speed of the drive shaft 42. A decoupler 40 is mechanically connected to the differential 36 for driving the generator when the decoupler 40 is provided a positive net torque. The decoupler 40 disengages the generator 34 when it receives a negative net torque. When driven, the generator 34 converts the rotational kinetic energy into electric energy. The generator 34 is electrically connected to the first and second battery bank 52 and 54 respectively, for providing a regulated voltage for recharging the respective battery banks. The battery banks 52 and 54 are wired to a voltage regulator 56. The voltage regulator 56 is controlled by an accelerator 58 connected thereto. The accelerator 58 receives user input controls for signaling the voltage regulator 56 to control the voltage level to be dispensed to the primary motor 48 connected thereto. The voltage regulator 56 is preprogrammed to provide the designated voltage to the primary motor 48 from the primary battery bank 52. If the primary battery bank 52 reaches a predetermined charge indicating a weak charge, the regulator 56 will then begin to draw electrical current from the secondary battery 54. A tachometer 60 is also connected to the voltage regulator 56. The tachometer 60 is connected to a sensor 62, which is mechanically mounted to the drive shaft 42. The sensor 62 detects the revolutions per minute made by the drive shaft 42. The voltage regulator 56 is preprogrammed to provide the connected tachometer 60 a regulated voltage from the secondary battery bank 54 when the tachometer reads a predetermined value of revolutions per minute. The secondary motor 50 is also connected to the tachometer 60. When the tachometer 60 receives the voltage from the secondary battery bank 54, the secondary motor 50 is provided the voltage via its connection to the tachometer 60, thus, the secondary motor 50 is activated for providing additional driving force to the drive shaft 42.

Figure 6:
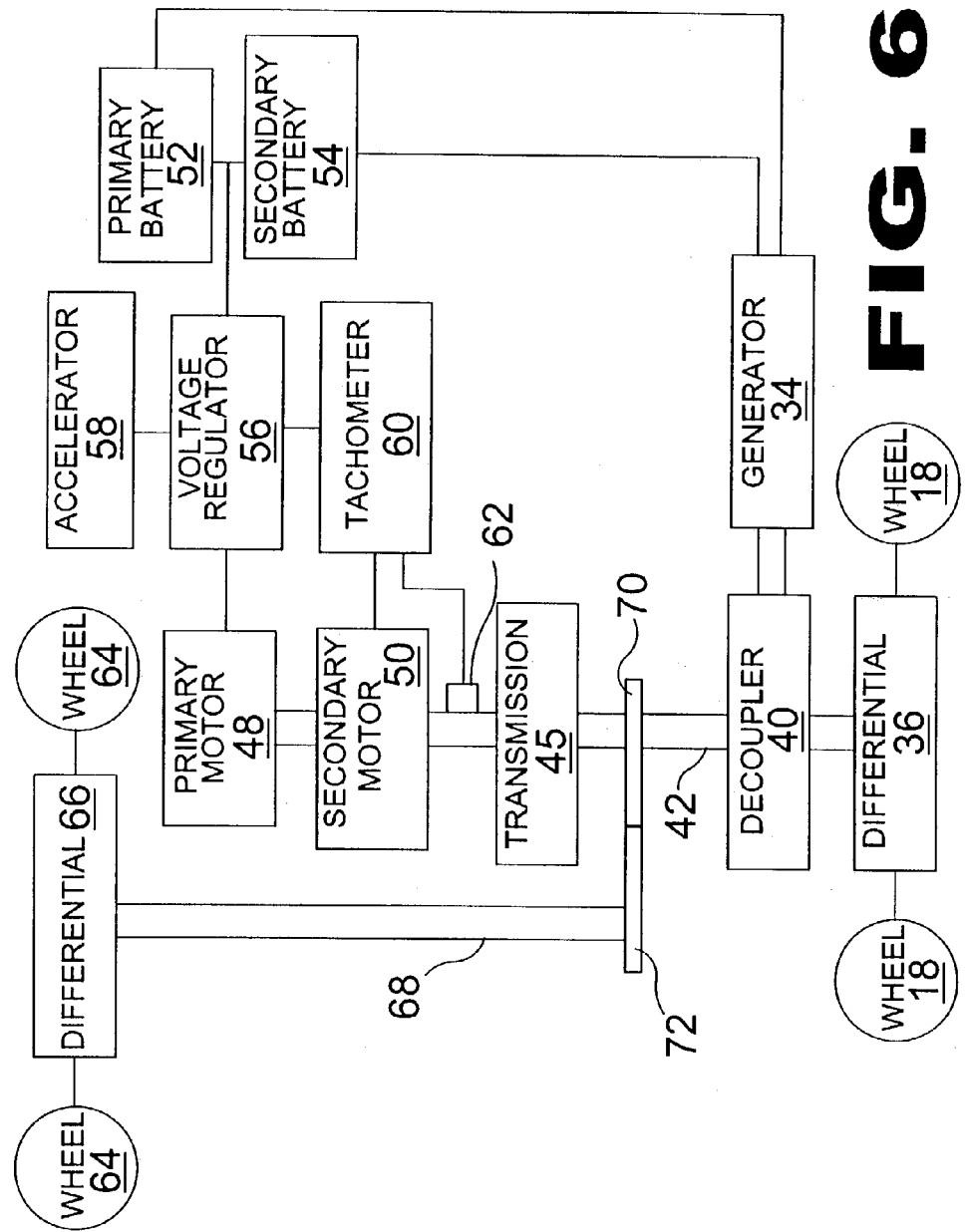
FIG. 6 is a block diagram of the axle generator of the present invention adapted for use by a 4-wheel drive vehicle.

FIG. 6 is a block diagram of the dual motor axle-driven generator system 10 of the present invention adapted for use by a 4-wheel drive vehicle. The illustrated embodiment of the generator system 10 is representative of that described in FIG. 4, wherein the generator is mechanically connected to the drive shaft 42 as opposed to the differential 36. The decoupler 40 is mechanically connected to the drive shaft 40. A generator 34 is mechanically connected to the decoupler 40 in a manner by which a positive torque on the drive shaft 42, as associated with the forward movement of the vehicle, drives the generator 34, and a negative net torque disengages the generator 34 from the decoupler 40. The remaining components and functionality thereof is identical to that described in FIG. 5, however there is the addition of an additional set of driving wheel 64.

The secondary set of driving wheels 64 are mechanically connected to a secondary differential 66. The secondary differential 66 operates in a similar fashion to the first differential 36. The secondary differential 66 is mechanically connected to a secondary drive shaft 68. The secondary drive shaft is selectively connected to the first drive shaft 42 through first and second clutch components 70 and 72. The first clutch component 70 is mechanically connected to the first drive shaft 42 and the second clutch component 72 is connected to the second drive shaft 68. The two shafts 42 and 68 are connected at the clutch components positioned between the transmission 45 and the differential 36 so that both shafts 42 and 68 rotate at the same speed. When activating four-wheel drive, the first clutch component 70 engages the second clutch component 72 so that the first shafts 42 drives the second shaft 68. Thus, the secondary differentia 66 is driven in unison by the, drive shaft first and second. If additional driving force is required, the secondary motor 50 can be selectively activated while engaged in four wheel drive.

FIG. 7 is a block diagram of the dual motor axle-driven generator system 10 of the present invention showing the activation of the secondary motor 50 due to a hard acceleration. Similarly to FIG. 2, the generator 34 is mechanically connected to the drive differential 36 as opposed to the drive shaft 42. Mechanical connections are shown with double line and electrical connections are shown using as single lines.

A primary motor 48 and a secondary motor 50 are mechanically connected to the drive shaft 42 for providing a torque for rotating the drive shaft 42. A transmission 45 is mechanically connected to the drive shaft between the secondary motor and the differential 36 for providing a mechanical advantage by increasing or decreasing the revolution speed of the drive shaft 42. The drive shaft 42 is mechanically connected to the differential 36. The differential 36 drives the designated wheels 18 when the motors 48 and 50 provide a driving force to the drive shaft 42. A decoupler 40 is mechanically connected to the differential 36 for driving the generator when the decoupler 40 is provided a positive net torque. The decoupler 40 disengages the generator 34 when it receives a negative net torque. When driven, the generator 34 converts the rotational kinetic energy into electric energy. The generator 34 is electrically connected to the first and second battery bank 52 and 54, respectively, for providing a regulated voltage for recharging the respective battery banks. The battery banks 52 and 54 are wired to a voltage regulator 56. The voltage regulator 56 is controlled by an accelerator 58 wired thereto.

The accelerator 58 receives user input controls for signaling the voltage regulator 56 to control the voltage level to be dispensed to the primary motor 48 wired thereto. The voltage regulator 56 is preprogrammed to provide the designated voltage to the primary motor 48 from the primary battery bank 52. If the primary battery bank 52 reaches a predetermined charge indicating a weak charge, the regulator 56 begins to draw electrical current from the secondary battery 54. A tachometer 60 is also wired to the voltage regulator 56. The tachometer 60 is wired to a sensor 62, which is mechanically mounted to the drive shaft 42. When the drive shaft 42 is driven to a predetermined RPM, as indicated by the tachometer 60, the secondary motor 50 is activated. Activating the secondary motor 50 provides an additional driving force to the drive shaft 42. Additionally, the work load is then shared by both the primary and secondary battery bank 52 and 54. The secondary motor 54 remains activated until the accelerator is released or eased and the tachometer reading decreases to an RPM less than the predetermined. While both motors 48 and 50 are operative, the generator 34 is disengaged from the drive shaft 42 by the decoupler 40. This directs the produced kinetic energy entirely to the wheels without any energy being supplied to the generator 34. Upon decreasing the RMP of the vehicle below the predetermined RPM, the secondary battery 54 will receive a regenerative charge from the generator 34 while the vehicle is moving in a forward direction.

FIG. 8 is a block diagram of the dual motor axle-driven generator system 10 of the present invention showing the charging of the primary battery bank 52 while the vehicle is running off of the energy provided by the secondary battery bank 54. If the continued use of the vehicle depletes the energy of the primary battery pack 52, the voltage regulator disconnects from the primary battery bank 52, as illustrated with the dashed connecting line, and initiates drawing energy from the secondary battery 54 while the primary battery 52 receives a regenerative charge from the generator 34. The generator 34 produces the regenerative charge by converting the rotational kinetic energy provided by the drive shaft 42 into electric energy. The generator 34 is provided rotational kinetic energy from the drives haft 42 while the drive shaft is driven by the secondary motor 54, or while coasting without the use of an internal driving force. The generator 34 may incorporate a flywheel so that the generator 34 will continue to provide a regenerative charge to the primary battery bank 52 while the vehicle is at rest. The regenerative capabilities of the generator 34 allow for prolonged usage of the electric vehicle before necessitating an external electric source to charge the battery banks 52 and 54.

In operation, a primary motor drives a drive train for propelling an electric vehicle. The primary motor is provided electric energy from a primary energy bank. A secondary motor, powered by a secondary battery bank, may be selectively activated to provide additional driving force for rotating the drive shaft and thereby propelling the electric vehicle.

Activation of the secondary motor may be automatically achieved by connecting the secondary motor to a tachometer and a voltage supply, wherein the secondary motor is provided electric energy only when a predetermined RPM is reached. Alternatively, the secondary motor may be activated by selectively pressing a button, such as an on/off switch when an operator of the electric vehicle may deem extra power necessary.

Having at least two battery banks allows for a reserve energy supply to be used when the primary battery bank is depleted. Thus, the electric powered vehicle is capable of an increased cruising range before requiring an external electric source to recharge the battery banks. Even further, the drive shaft is coupled to a generator. The generator is connected to all battery banks, providing a regenerative charge to any battery not providing the motors with energy. By coupling the generator to the drive shaft, the generator is driven whether the motors are operative or if the vehicle is just coasting down a hill. The generator converts the rotational kinetic energy of the drive shaft into electric energy for charging the battery banks. If a hard acceleration is necessary, as described earlier, the generator is disengaged from the drive shaft and thus does to not absorb any kinetic energy from the drive shaft while directing the torque produced by the combined motors to the wheels of the vehicle.

While the vehicle is at cruising speeds and being driven by the primary motor, the secondary motor is inoperative. Therefore, the primary battery source provides the primary motor with electric energy. At this time the generator is coupled to the drive shaft generates an electric charge and charges the inoperative battery. After a prolonged duration of primary motor use, the primary battery bank may become nearly depleted of energy. In such a circumstance, the primary battery is disconnected by the voltage regulator from providing energy to the primary motor and the secondary battery bank is connected thereto for providing electric energy. While the vehicle is driven by the leave in motor with the secondary battery bank's resources, the primary battery receives a regenerative charge from the generator coupled to the drive shaft, thus, enabling the vehicle an extended cruising range before necessitating an external electric charge.

By using a drive shaft for transferring the driving force of the motors to the wheels, the vehicle may be easily adapted to a 4-wheel drive vehicle without requiring additional motors and battery banks by equipping the second set of wheels with a differential and a drive shaft. The secondary drives shaft is selectively coupled to the first drive shaft for creating a driving force for driving.

at all four wheels.

From the above description it can be seen that the dual motor axle-driven generator system of the present invention is able to overcome the shortcomings of prior art devices by providing generating system which is able to provide an electric vehicle with increased cruising range by charging one rechargeable battery bank while another is in use. Additionally, the present invention enables the use of a secondary motor to be used in conjunction with the primary motor at times where additional driving force may be necessary. Further, the dual motor axel driven generator is easily modified to equip a 4-wheel drive vehicle. And yet further, the generator is capable of producing a regenerative charge while the vehicle is at rest by incorporating a flywheel into the generator. And yet further, the generator is capable of being attached directly to the differential or the drive shaft of the vehicle. Furthermore, the system of the present invention is simple and easy to use and economical to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A dual motor axle driven system for powering a vehicle, said system comprising:
 a) a first electric motor for driving wheels of the vehicle;
 b) a second electric motor for selectively driving the wheels of the vehicle;

c) a first battery pack coupled to provide power to said first electric motor;

d) a second battery pack coupled to provide power to said second electric motor; and e) a generator connected to a differential gear train of the vehicle and to both said first and second battery packs whereby rotation of the wheels of the vehicle transfers rotational kinetic energy to the differential gear train for conversion into electrical energy by said generator for recharging said first and second battery packs while the vehicle is in motion and thereby increasing the distance the vehicle is able to travel before requiring recharging of said first and second battery packs, wherein said second battery pack is coupled to provide power to said first electric motor when said first battery pack requires recharging.

2. The system as recited in claim 1, further comprising means for measuring a revolution speed of a drive shaft of the vehicle and wherein said vehicle is powered by said first electric motor when the measured revolution speed of the drive shaft is less than a threshold value.

3. The system as recited in claim 2, wherein said vehicle is powered by both said first and second electric motors when the measured revolution speed of the drive shaft is greater than a threshold value.

4. The system as recited in claim 3, wherein said generator recharges said second battery pack when the vehicle is powered by said first electric motor.

5. The system as recited in claim 4, wherein said vehicle is powered by said second electric motor when said first battery pack is discharged.

6. The system as recited in claim 5, wherein said generator recharges said first battery pack when the vehicle is powered by said second electric motor.

7. The system as recited in claim 2, further comprising means for selectively activating said second electric motor when the measured revolution speed of the drive shaft is less than the threshold value.

* * * * *